United States Patent

Pigozzi

[19]

[11] Patent Number: 6,039,669
[45] Date of Patent: Mar. 21, 2000

[54] GEAR CHANGE FOR AN AUTOMOBILE VEHICLE

[75] Inventor: Gian Maria Pigozzi, Brescia, Italy

[73] Assignee: Iveco Fiat S.p.A., Turin, Italy

[21] Appl. No.: 09/191,286

[22] Filed: Nov. 12, 1998

[30] Foreign Application Priority Data

Nov. 12, 1997 [IT] Italy .................... T097A0991

[51] Int. Cl.[7] .................................................. F16H 3/091
[52] U.S. Cl. ............................................. 475/207; 74/333
[58] Field of Search ...................... 74/333, 325; 475/207

[56] References Cited

U.S. PATENT DOCUMENTS

| 2,505,449 | 4/1950 | Wemp ......................................... 74/333 |
| 5,181,431 | 1/1993 | Zaiser et al. .............................. 74/333 |
| 5,309,559 | 5/1994 | Thomas et al. ........................... 74/325 |
| 5,351,569 | 10/1994 | Trick et al. ................................ 74/329 |
| 5,365,800 | 11/1994 | Muller ........................................ 74/333 |
| 5,526,709 | 6/1996 | Thomas et al. ........................... 74/325 |

FOREIGN PATENT DOCUMENTS

| 0332961 | 9/1989 | European Pat. Off. . |
| 1258053 | 7/1961 | France . |
| 2623869 | 6/1989 | France . |
| 2042103 | 9/1980 | United Kingdom . |

OTHER PUBLICATIONS

International Search Report dated Feb. 16, 1999.

*Primary Examiner*—Dirk Wright
*Attorney, Agent, or Firm*—Frost & Jacobs LLP

[57] ABSTRACT

A gear change for an automobile vehicle comprising an outer box, an input shaft and a driven shaft coaxial with one another, and at least one countershaft that can be angularly coupled with the input shaft and with the driven shaft by means of a plurality of pairs of gears in order to define a plurality of transmission ratios between the input shaft and the driven shaft; the input shaft and the driven shaft are borne via bearings by respective walls of the box in the vicinity of respective first end portions opposite one another and comprise respective second portions mounted one inside the other and mutually supporting one another via a pair of axially spaced bearings.

5 Claims, 1 Drawing Sheet

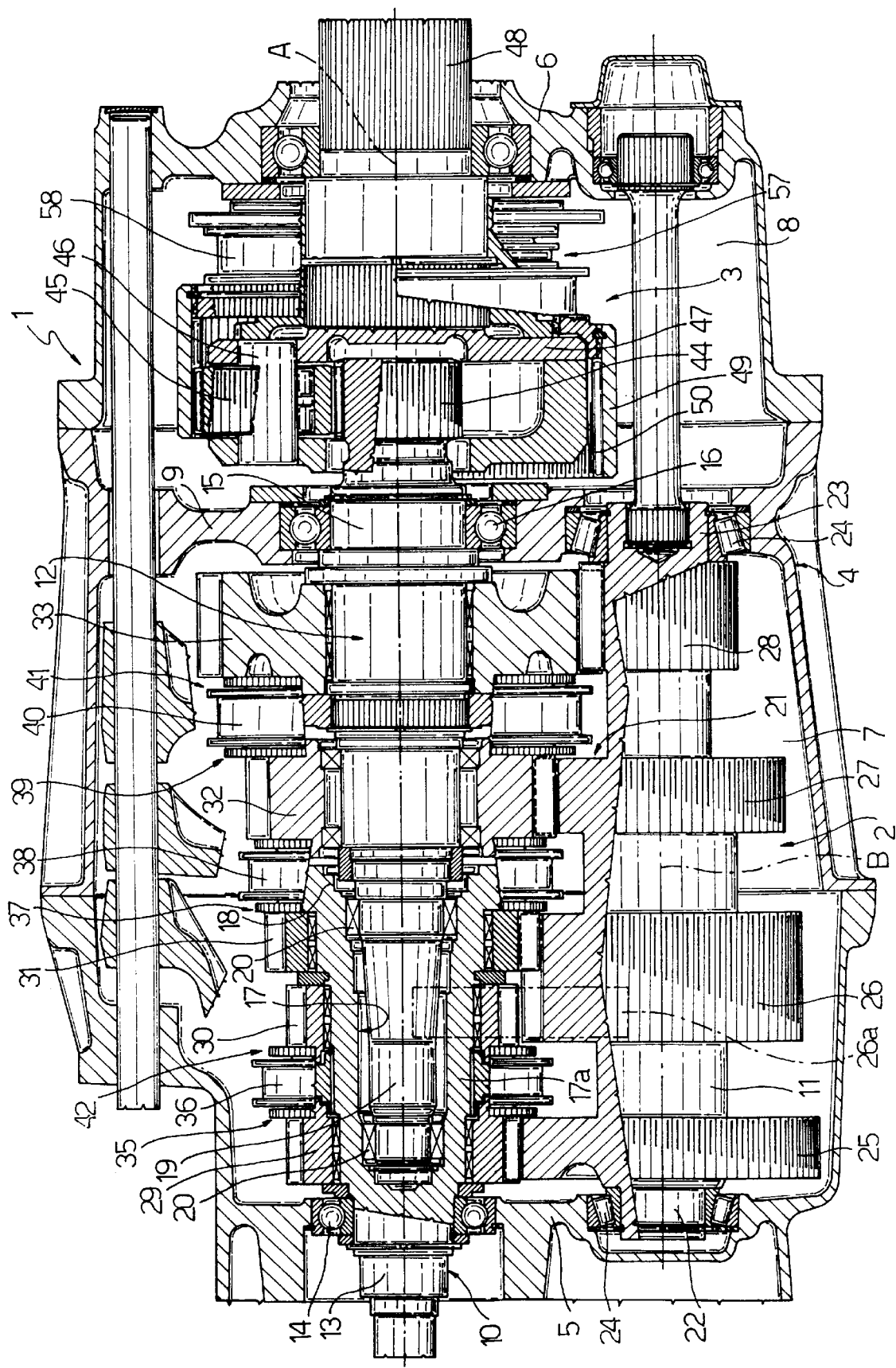

GEAR CHANGE FOR AN AUTOMOBILE VEHICLE

BACKGROUND OF THE INVENTION

The present invention relates to a gear change for an automobile vehicle, in particular an industrial vehicle.

Gear changes are known which comprise an outer box, an input shaft and a driven shaft which are coaxial with one another and at least one countershaft that can be angularly coupled with the input shaft and with the driven shaft via a plurality of pairs of gears in order to define a plurality of transmission ratios between the input shaft and the driven shaft; the input shaft and the driven shaft are borne via respective pairs of bearings by respective walls of the box in the vicinity of respective first end portions that are axially opposite one another.

The second ends of the two shafts, which are adjacent to one another, are generally borne by an intermediate wall of the box; for instance, the second end of one of the two shafts is borne by the intermediate wall via a bearing and in turn supports, via a further bearing, the second end of the other shaft with which it is internally or externally coaxial.

A drawback of gear changes of the type described above lies in the fact that the intermediate wall of the box has to be provided; the box is then complex and costly and increases the overall axial bulk of the gear change.

SUMMARY OF THE INVENTION

The object of the present invention is provide a gear change for an automobile vehicle, in particular an industrial vehicle, which is free from the above-described drawbacks connected with known gear changes.

This object is achieved by the present invention which relates to a gear change for an automobile vehicle, in particular an industrial vehicle, of the type comprising an outer box, an input shaft and a driven shaft coaxial with one another, and at least one countershaft that can be angularly coupled with the input shaft and with the driven shaft by means of a plurality of pairs of toothed wheels in order to define a plurality of transmission ratios between the input shaft and the driven shaft, the input shaft and the driven shaft having respective first end portions axially opposed to one another and respective second portions adjacent to one another, the first portions of these shafts being borne via bearings by respective walls of the box, the second portion of one of these shafts having a cavity housing the second portion of another one of these shafts, characterised in that it comprises two bearings housed in the cavity, interposed between the second portions of the shafts and axially spaced from one another in order to define a relative support between these shafts.

BRIEF DESCRIPTION OF THE DRAWING

The present invention is set out in further detail in the following description of a preferred embodiment thereof, given purely by way of non-limiting example and made with reference to the accompanying drawing which shows a longitudinal section through this embodiment.

DETAILED DESCRIPTION OF THE INVENTION

In the drawing, a gear change for an industrial vehicle, in particular a lorry, is shown overall by 1.

The gear change 1 comprises a main train 2 and a range reducer 3 in cascade housed in an outer box 4. The box 4 has respective opposite heads walls 5, 6 and is divided into two compartments 7, 8, respectively housing the main train 2 and the range reducer 3, by an intermediate wall 9.

The main train 2 comprises an input shaft 10 of axis A, a countershaft 11 of axis B parallel to the axis A, a driven shaft 12 coaxial with the input shaft 10 and a plurality of gears, shown overall by 21, to connect the input shaft 10 and the driven shaft 12 with the countershaft 11 in accordance with a plurality of transmission ratios, as will be described in detail below.

The input shaft 10 is borne by the head wall 5 of the box 4 in the vicinity of a first end portion 13 of this shaft 10, via a bearing 14. The driven shaft 12 is borne by the wall 9 of the box 4 in the vicinity of a first end portion 15 of this shaft 12 opposite the end portion 13 of the input shaft 10, via a bearing 16.

The input shaft 10 has an axial cavity 17 open at one end 18 of this shaft opposite the portion 13; the cavity 17 extends along substantially the whole of the portion 17a of the shaft 10 comprised between the end 18 and the end portion 13. A second end portion 19 of the driven shaft 12, opposite the portion 15, extends within the cavity 17; the mutual support of the portions 17a and 19 takes place via a pair of bearings 20, advantageously roller cages, interposed radially between these portions and disposed spaced from one another in the vicinity of the opposing axial ends of the cavity 17.

The countershaft 11 is borne, at the location of its opposite ends 22, 23 by the head wall 5 and the intermediate wall 9 of the box 4 via respective bearings 24.

The countershaft 11 integrally defines four toothed wheels 25, 26, 27, 28 spaced axially from one another along the shaft 11 from the end 22 to the end 23 and having progressively decreasing diameters.

The wheel 25 engages with a first toothed wheel 29 mounted idly on the input shaft 10; the wheel 26 is angularly coupled, via an inverting idler gear 26a, with a second idle toothed wheel 30 on the input shaft 10 and engages simultaneously with a third idle toothed wheel 31 on the input shaft 10.

The wheel 27 and the wheel 28 respectively engage with a toothed wheel 32 mounted idly on the driven shaft 12 in a position immediately adjacent to the end 18 of the input shaft 10 and with a toothed wheel 33 mounted idly on the driven shaft 12 in a position adjacent to the bearing 16.

The wheels 29 and 30 may be selectively engaged on the shaft 10, in a known manner which is not therefore described in detail, by a synchronised coupling 35 interposed between these wheels 29, 30 and provided with a sliding control sleeve 36. In a totally analogous way, the wheels 31 and 32 can be selectively engaged on the input shaft 10 by a synchronised coupling 37 interposed between these wheels 31, 32 and provided with a sliding control sleeve 38. Lastly, the wheels 32 and 33 can be selectively engaged on the driven shaft 12 by a synchronised coupling 39 interposed between these wheels 32, 33 and provided with a sliding control sleeve 40.

The sleeves 36, 38 and 40 are shown in their intermediate (neutral) position and can move between a position displaced to the left (with reference to the drawing) in which they are adapted respectively to engage the wheel 29 on the input shaft 10, the wheel 31 on the input shaft 10 and the wheel 32 on the driven shaft 12, and a position displaced to the right (with reference to the drawing) in which they are adapted respectively to engage the wheel 30 on the input shaft 10, the wheel 32 on the input shaft 10 and the wheel 33 on the driven shaft 12.

From an operational point of view, the main train 2 can be considered as formed by a "base" stage 41 with two ratios T1, T2 defined by the pairs of wheels 28–33 and 27–32 and by a ratio multiplier or "splitter" stage 42 disposed upstream of the base stage 41 and having three forward gear ratios L (low), M (middle) and H (high) defined by the pairs of wheels 29–25, 31–26 and 32–27 and a reverse gear ratio R defined by the wheels 26 and 30 via the idler gear 26a.

The range reducer 3 is of epicyclic type and essentially comprises, in a known manner, a sun gear 44 provided rigidly on the end portion 15 of the driven shaft 12 and a plurality of planet gears 45 which engage with the sun gear 44 and are angularly equidistantly spaced about the latter. The planet gears 45 are mounted to rotate on respective pins 46 borne by a train carrier 47 rigid with an output shaft 48 of the gear change which is rigidly supported with respect to the box 4 of the gear change 1.

The range reducer 3 further comprises an outer crown 49 provided with inner teeth 50 which engage with the planet gears 45, and can slide axially thereon. The radial support of the crown 49 is provided exclusively by the planet gears 45 with respect to which it can therefore centre itself.

The crown 56 may be made selectively rigid with the box 4 or the train carrier 47 by a synchronised coupling 57 of known type which is not therefore described in detail, provided with a control sleeve 58 rigid with the crown 56 and adapted to be axially displaced by an actuation device (not shown).

The gear change 1 operates as follows.

The ratios L, R, M and H of the splitter 42 are obtained by engaging the wheel 29 (sleeve 36 on the left), the wheel 30 (sleeve 36 on the right), the wheel 31 (sleeve 38 on the left) and the wheel 32 (sleeve 38 on the right) respectively on the input shaft 10. The two ratios T1 and T2 of the base stage are obtained by engaging the wheel 33 (sleeve 40 on the right) and the wheel 32 (sleeve 40 on the left) respectively on the driven shaft 12.

The ratios L, M, H of the splitter 41 form a progression of ratio lower than that defined by the ratios T1, T2 of the base stage 42; therefore, the six forward transmission ratios M1–M6 that can be obtained with the main train 2 form a progression whose elements are in the following order: M1=L*T1; M2=M*T1; M3=H*T1; M4=L*T2; M5=M*T2; M6=1 (it should be noted that the ratio M6 which is obtained by engaging the wheel 32 simultaneously on the input shaft 10 and on the driven shaft 12 defines a condition of direct take-up between these shafts).

Two reverse gears R1, R2 are obtained by combining the ratio R in the splitter 41 with the two ratios of the base stage 42.

The range reducer 3 may be set to a condition of direct take-up (sleeve 58 on the left as shown in the lower part of the drawing) in which the crown 49 is rigid with the train carrier 47 and therefore locks the epicyclic train by making the sun gear 44 (and therefore the driven shaft 12) angularly rigid with the train carrier 47 (and therefore with the output shaft 48 of the gear change 1) and to a condition of reduction (with a high reduction ratio, for instance greater than 3) in which the crown 49 is fixed to the box 4 (sleeve 58 on the right, top part of the drawing).

Two successive ranges of ratios forming overall a progressive series of twelve forward gear ratios are therefore defined in combination with the ratios M1–M6 of the main train 1.

The two reverse ratios of the main train 1 are used only in combination with the reduced position of the reducing train 3. Therefore, the gear change 1 has a total of twelve forward gears and two reverse gears.

The advantages that are achieved with the present invention are evident from an examination of the characteristic features of the gear change 1.

In particular, the mutual support between the input shaft 10 and the driven shaft 12 provided by the two bearings 20 makes it possible to avoid the use of an intermediate wall of the box 4 within the compartment 7. The box 4 is therefore of less complex shape and is less costly and lighter. Moreover, the axial bulk of the main train 1 is reduced and the gear change is therefore more compact.

A further reduction of bulk and costs is provided by the use of a single wheel 26 on the countershaft 11 coupled simultaneously with the wheels 30 (via the idler gear 26a) and 31 of the input shaft 10 to form a forward gear ratio and a reverse gear ratio of the splitter 42.

It is evident that modifications and variations could be made to the gear change 1 as described without thereby departing from the scope of protection of the claims.

In particular, the range reducer 3 may be different or may be omitted when the overall number of gears of the gear change can be obtained with a single train; the number of gears of the main train may be different and the arrangement of the gears may be varied; moreover, the main train may have two countershafts rather than a single countershaft.

What is claimed is:

1. A gear change for an automobile vehicle, in particular an industrial vehicle, of the type comprising an outer box (4), an input shaft (10) and a driven shaft (12) coaxial with one another, and at least one countershaft (11) that can be angularly coupled with the input shaft (10) and with the driven shaft (12) by means of a plurality of pairs of toothed wheels (13) in order to define a plurality of transmission ratios between the input shaft (10) and the driven shaft (12), the input shaft (10) and the driven shaft (12) having respective first end portions (13, 15) axially opposite one another and respective second portions (17a, 19) adjacent to one another, the first portions (13, 15) of these shafts being borne via bearings (14, 16) by respective walls (5, 9) of the box (4), the second portion (17a) of one of these shafts (10) having a cavity (17) housing the second portion (19) of another one of these shafts (12), characterised in that it comprises two bearings (20) housed in the cavity (17), interposed between the second portions (17a, 19) of the shafts (10, 12) and axially spaced from one another in order to define a relative support between these shafts (10, 12), said gear change further comprising, in cascade, a main train (2) comprising said input shaft (10), the countershaft (11) and the driven shaft (12) and an epicyclic range reducer (3) having a sun gear (44) rigid with said driven shaft (12).

2. A gear change as claimed in claim 1, characterised in that the main train (2) comprises a ratio multiplier stage (42) defined by a plurality of pairs of toothed wheels (29, 25; 30, 26; 32, 27) interposed between the input shaft (10) and the countershaft (11) and a base stage (41) defined by a plurality of pairs of toothed wheels (27, 32; 28, 33) interposed between the countershaft (11) and the driven shaft (12).

3. A gear change as claimed in claim 2, characterised in that the ratio multiplier stage (42) comprises an idler gear (26a) engaging with a first wheel (30) borne by the input shaft (10) and with a wheel (26) of the countershaft (11).

4. A gear change as claimed in claim 3 characterised in that the wheel (26) of the countershaft (11) engages simultaneously with the idler gear (26a) and with a second wheel (31) borne by the input shaft (10).

5. A gear change as claimed in claim 2, characterised in that the base stage (4) defines two ratios (T1, T2) and in that the ratio multiplier stage (42) defines three forward gear ratios (L, M, H) and a reverse gear ratio (R).

* * * * *